United States Patent
Beranger et al.

(10) Patent No.: US 9,172,077 B2
(45) Date of Patent: Oct. 27, 2015

(54) LOW-LOSS STORAGE BATTERY

(75) Inventors: Bruno Beranger, Saint Martin d'uriage (FR); Daniel Chatroux, Teche (FR); Julien Dauchy, Chatte (FR)

(73) Assignee: COMMISSARIAT À L'ÉNERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 786 days.

(21) Appl. No.: 13/382,051

(22) PCT Filed: Jul. 6, 2010

(86) PCT No.: PCT/EP2010/059674
§ 371 (c)(1),
(2), (4) Date: Jan. 26, 2012

(87) PCT Pub. No.: WO2011/003924
PCT Pub. Date: Jan. 13, 2011

(65) Prior Publication Data
US 2012/0119704 A1    May 17, 2012

(30) Foreign Application Priority Data
Jul. 8, 2009    (FR) ..................................... 09 03358

(51) Int. Cl.
*H02J 7/00* (2006.01)
*H01M 2/20* (2006.01)
*H01M 10/42* (2006.01)
*H01M 10/0525* (2010.01)

(52) U.S. Cl.
CPC .......... *H01M 2/206* (2013.01); *H01M 10/4207* (2013.01); *H01M 10/0525* (2013.01); *H02J 7/0013* (2013.01); *Y02T 10/7011* (2013.01); *Y02T 10/7055* (2013.01)

(58) Field of Classification Search
CPC ...... H02J 7/0024; H02J 7/1423; Y02E 60/12; H01M 10/441; Y02T 10/7005
USPC .......................................................... 320/117
See application file for complete search history.

(56) References Cited

U.S. PATENT DOCUMENTS

| | | | |
|---|---|---|---|
| 6,051,955 A | 4/2000 | Saeki et al. | |
| 6,140,799 A * | 10/2000 | Thomasson | 320/117 |
| 2003/0025480 A1* | 2/2003 | Pannwitz | 320/134 |
| 2003/0062874 A1* | 4/2003 | Furukawa | 320/121 |
| 2010/0072950 A1* | 3/2010 | Tatebayashi et al. | 320/134 |

FOREIGN PATENT DOCUMENTS

| | | |
|---|---|---|
| JP | 10-322915 | 12/1998 |
| JP | 2004-31268 | 1/2004 |
| JP | 2008-43036 | 2/2008 |
| JP | 2008-61469 | 3/2008 |
| WO | WO 2009/021762 | 2/2009 |

* cited by examiner

*Primary Examiner* — Arun Williams
(74) *Attorney, Agent, or Firm* — Occhiuti & Rohlicek LLP (57) ABSTRACT

A storage battery comprises a first branch and a second branch, each of which has a first cell and a second cell, the first and second cells being connected in series, and a first switch for connecting the first cell from the first branch and the first cell from the second branch in parallel and connecting the second cell from the first branch and the second cell from the second branch in parallel. The first switch has a cutoff threshold selected to conduct current when one of the cells forms an open circuit.

10 Claims, 6 Drawing Sheets

LOW-LOSS STORAGE BATTERY

CROSS REFERENCE TO RELATED APPLICATIONS

This application is the national stage entry under 35 USC 371 for PCT/EP2010/059674, filed Jul. 6, 2010, which claims the benefit of the Jul. 8, 2009 priority date of French Application No. 0903358. The contents of both the foregoing applications are incorporated herein by reference.

The invention relates to electrochemical storage batteries. These may for example be used in the field of electrical and hybrid transport vehicles or onboard systems.

An electrochemical cell usually has a nominal voltage of the following order of magnitude:
1.2 V for NiMH-type batteries;
3.3 V for a lithium-ion iron phosphate (LiFePO4) technology;
4.2 V for a technology of the lithium-ion type based on cobalt oxide.

These nominal voltages are too low compared with the requirements of most systems to be powered. To obtain the appropriate voltage level, a plurality of cells are placed in series. To obtain high power and capacity levels, a plurality of cells are placed in parallel. The number of stages (number of cells in series) and the number of cells in parallel in each stage vary according to the desired voltage, the desired current and the desired capacity of the battery. The combination of a plurality of cells is called a storage battery.

When designing a storage battery, the aim is to provide a certain power level under a defined operating voltage. To maximize the power, the current delivered is maximized by reducing the parasitic internal resistance of the battery as far as possible.

Lithium-ion batteries are very suitable for transport applications because of their capability of storing a large amount of energy in a small mass. Among lithium-ion battery technologies, batteries based on iron phosphate offer a high level of intrinsic security compared with lithium-ion batteries based on cobalt oxide, to the detriment of a slightly lower energy per unit mass. Moreover, lithium-ion batteries also have a minimum voltage below which a cell may undergo degradation.

Figure 1:
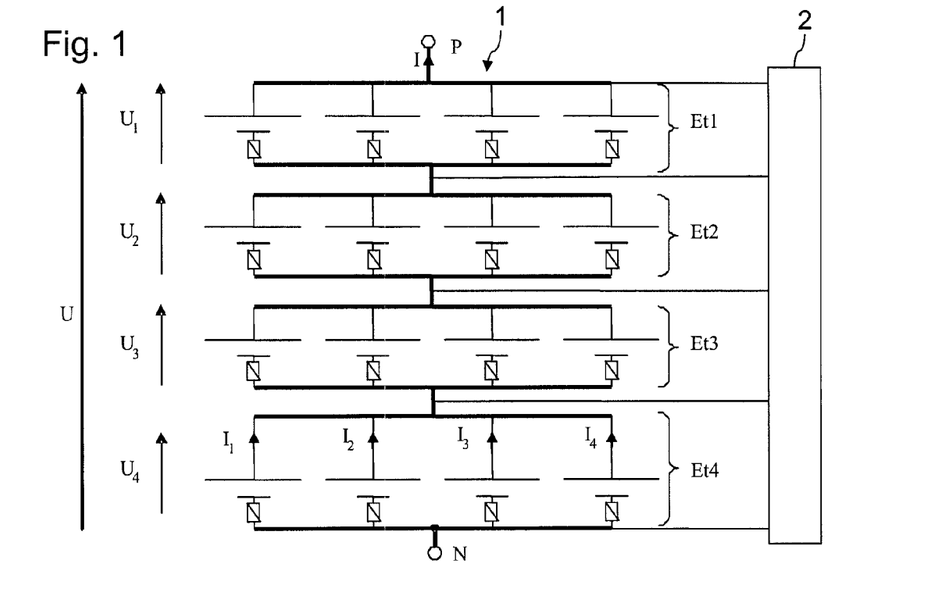
FIG. 1 is a schematic representation of a battery of the prior art.

FIG. 1 shows a lithium-ion storage battery 1 known from the prior art. The battery 1 is composed of four stages Et1, Et2, Et3 and Et4 connected in series. Each stage comprises four similar cells connected in parallel. The terminals of the cells of a given stage are linked together by means of electrical connections of large cross section. Each stage is also linked to the adjacent stages by means of electrical connections of large cross section so as to allow large currents to flow, corresponding to the sum of the currents of the cells of a stage. One or more loads are intended to be connected to the N and P terminals of the battery 1.

The voltage at the terminals of the four stages is denoted by U1, U2, U3 and U4 respectively. In this diagram, the total voltage U between the terminals N and P of the battery 1 is the sum of the voltages U1, U2, U3 and U4. The current flowing through each cell of the fourth stage Et4 is denoted by I1, I2, I3 and I4 respectively. The current I generated at the terminal P of the battery 1 is the sum of the currents I1, I2, I3 and I4.

To protect the battery 1 from the consequences of a short circuit in a cell, each cell has a fuse which is connected in series thereto. When a cell forms a short circuit, the current flowing through it increases substantially and makes its series fuse melt, so as to protect the rest of the battery 1. In the absence of a fuse, the energy dissipation in the cell when there is a short circuit would cause overheating thereof and overheating of the other cells, which were discharging. Such dissipation could be the cause of a fire starting.

Lithium-ion technologies based on cobalt oxide and based on iron phosphate are particularly at risk when a stage comprises a large number of cells in parallel for storing a large amount of energy. The use of fuses therefore proves to be particularly appropriate for such technologies.

The various cells of a lithium-ion battery do not naturally clip the voltage at the terminals thereof. It is therefore necessary to add, for each stage, an ancillary charging control/balancing circuit 2 in order for the stages Et1 to Et4 to be able to be correctly charged. By placing four stages of four cells in series, it is necessary to associate with each stage a charging control/balancing function. The circuit 2 therefore controls the charging and the balancing of each stage of the battery 1.

The charging of a cell corresponds to an increasing voltage at the terminals thereof. A cell is considered to be charged when it has reached a nominal voltage level defined by its electrochemical processes. If the charging is interrupted before this voltage is reached, the cell is not completely charged.

Throughout the lifetime of the battery, certain defects may appear in certain cells making up the battery. A defect in one cell is generally manifested either by the cell being short-circuited or open-circuited or by a high leakage current in the cell. It is important to know the impact of the failure of a cell on the battery. An open circuit or a short circuit may cause overall failure of the entire battery.

In the case of a large leakage current appearing in a cell of a stage, the battery behaves as a resistor, causing the cells of the stage in question to discharge to zero. The risks of starting a fire are low as the energy is dissipated relatively slowly. In lithium-ion technology, the discharging of the cells of the stage to a zero voltage damages the cells, which means that not only the initially defective cell but the other cells have to be replaced. When a cell forms a short circuit, the three other cells of the stage initially discharge into this cell owing to the large cross section of the electrical connections therebetween. The fuse placed in series with the cell when there is a short circuit interrupts the undesirable discharging of the three other cells.

Such a battery has a number of drawbacks. The fuses are designed to pass large currents and thus incur a large overcost. Moreover, the internal resistance of the fuses increases the Joule losses inside the battery, thereby considerably reducing its power performance.

Document U.S. Pat. No. 6,051,955 discloses a storage battery comprising two branches connected in parallel. Each branch comprises three cells connected in series. These cells are charged and discharged via two output terminals. Protective transistors are interposed between one of the output terminals and each branch of cells. A monitoring circuit detects any excessive charging or discharging of the elements. If such is the case, the monitoring circuit opens the protective transistors between the output terminal and the branches of cells.

Each cell of a branch is connected in parallel to a cell of the other branch. Two fuses connected in series thus connect two respective cells. The monitoring circuit is connected to each node between two fuses in series.

This storage battery also includes fuses connected in series between a branch and a protective transistor.

Such a battery has a number of drawbacks:
large Joule losses are induced by the fuses in series and the protective transistors during operation of the battery;
any failure of a cell immediately interrupts the operation of the battery by the monitoring circuit;

the capacity of the battery is not optimal: during charging, the most highly charged cell interrupts the charging of the battery while the other cells have not yet reached their optimum charge. During discharging, the most discharged cell interrupts the discharging while the other cells have not yet reached their discharge threshold.

Document WO 2009/021762 discloses a storage battery comprising two branches in parallel. In one embodiment, each branch has four cells connected in series. The cells of the two branches are of different types: the first branch comprises high-power cells, whereas the second branch comprises high-capacity cells. Each high-capacity cell is connected in parallel to a high-power cell via a resistor. Such a battery may thus simultaneously respond to peak current demands and have a high capacity.

In practice, such a battery has drawbacks. The high-power cells do not appreciably improve the capacity of the battery. Moreover, the battery is in practice not protected from certain malfunctions. Thus, a short circuit in one cell may cause an overcurrent in the cell to which it is connected in parallel via a resistor. Since the cells of two branches are also of different type, no compensation is conceivable should there be a failure of a cell.

The object of the invention is to solve one or more of these drawbacks without impairing the level of security provided by the battery. The invention thus relates to a storage battery, comprising at least first and second branches each having at least first and second cells connected in series, the battery further comprising a switch by means of which the first cells are connected in parallel and by means of which the second cells are connected in parallel. The cutoff threshold of the switch is designed to conduct current when one of said cells forms an open circuit.

In one embodiment, the battery comprises a third branch having first and second cells connected in series, the battery further comprising another switch by means of which the first cells are connected in parallel and by means of which the second cells are connected in parallel.

According to another embodiment, said first cells form a first stage of the battery and said second cells form a second stage of the battery, the battery further comprising a balancing circuit, for balancing the charge of the cells, said circuit being connected to the terminals of each stage.

According to yet another embodiment, each junction between the cells in parallel is linked to the balancing circuit.

According to yet another embodiment, the cells of the first and third branches are nonadjacent and the balancing circuit is connected to the terminals of the cells of the first and third branches.

According to one embodiment, the cross section of the junction between the cells in parallel is smaller than the cross section of the junction between the cells in series.

According to yet another embodiment, the switch comprises a fusible electrical connection.

According to yet another embodiment, the cutoff threshold of the switch is designed to open when one of said cells is short-circuited.

According to one embodiment, said cells are of a type for which the application of a voltage at their terminals of 15% above their nominal voltage does not cause them to be destroyed.

According to yet another embodiment, the cells are of the lithium-ion type.

According to another embodiment, said branches are not provided with protective switches placed in series with said cells.

According to another embodiment, the internal resistance of said cells is less than the internal resistance of said switch.

Other features and advantages of the invention will become clearly apparent from the description given below, by way of indication but implying no limitation, and with reference to the appended drawings in which.

The invention proposes a battery comprising at least first and second branches each having at least first and second cells connected in series, the battery further including a switch by means of which the first cells are connected in parallel and by means of which the second cells are connected in parallel. The cutoff threshold of the switch is designed to conduct current when one of said cells forms an open circuit.

The switch provides effective protection of the cells of the battery from overcurrents during a malfunction, at a reduced cost and with less Joule dissipation in normal operation. In addition, the switch allows the battery to continue to be used by enabling all of the functional cells to compensate for the failure of a short-circuited cell.

Figure 2:
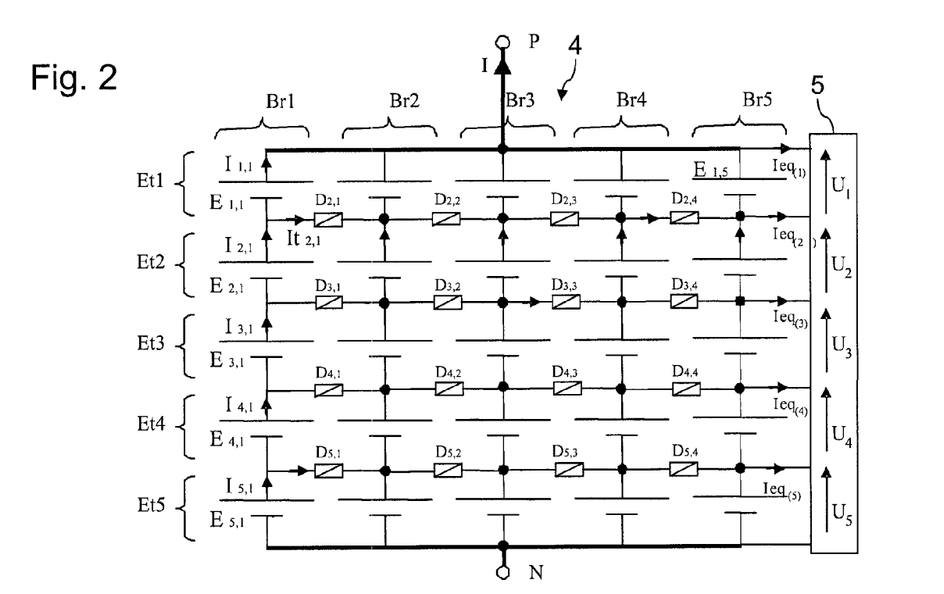
FIG. 2 is a schematic representation of one embodiment of a battery according to the invention.

FIG. 2 shows a battery 4 according to a first embodiment of the invention. The battery 4 has a positive terminal P and a negative terminal N. One or more loads may be connected between the terminals P and N. The battery 4 comprises several branches Br1 to Br5. In the example illustrated, the battery 4 comprises five branches. An index j corresponds hereafter to the branch $Br_j$. Each branch $Br_j$ comprises a plurality of cells $E_{i,j}$ connected in series, of the lithium-ion type based on iron phosphate. The branch $Br_1$ comprises the cells $E_{1,1}$, $E_{2,1}$, $E_{3,1}$, $E_{4,1}$ and $E_{5,1}$. In the example illustrated, each branch $Br_j$ comprises five cells $E_{i,j}$. An index i corresponds hereafter to a stage $Et_j$ that includes five cells belonging to each of the branches respectively.

The cells of a given stage are connected in parallel via switches. In general, the term "switch" denotes a switch for preventing the flow of electrical current and switching in the event of an overload so as to protect the components to which it is connected.

The cells $E_{1,j}$ of the first stage $Et_1$ are connected in parallel. The cells $E_{1,j}$ are connected via their positive terminal to the terminal P of the battery 4. Advantageously, these positive terminals are connected to the terminal P via connectors of large cross section, since this connection has the function of collecting the parallel currents of the various branches. The negative terminals of the cells $E_{1,j}$ of the first stage $Et_1$ are connected together via switches. Thus, the switch $D_{2,1}$ connects the negative terminal of the cell $E_{1,1}$ to the negative terminal of the cell $E_{1,2}$.

The cells $E_{2,j}$ of the second stage $Et_2$ are also connected in parallel. The cells $E_{3,j}$ of the third stage $Et_3$ on the one hand, and the cells $E_{4,j}$ of the fourth stage $Et_4$ on the other, are also connected in parallel. For each of these intermediate stages, the positive terminals of the cells of a given stage are connected together via switches and their negative terminals are also connected together via switches.

As illustrated, each switch is used for a parallel connection for two adjacent stages (two stages sharing connection nodes). Thus, the switch $D_{2,1}$ is used to connect the cells $E_{1,1}$ and $E_{1,2}$ in parallel, but also to connect the cells $E_{2,1}$ and $E_{2,2}$ in parallel.

The cells $E_{5,j}$ of the fifth stage $Et_5$ are connected in parallel. The positive terminals of the cells $E_{5,j}$ of the fifth stage $Et_5$ are connected together via switches. Thus, the switch $D_{5,1}$ connects the positive terminal of the cell $E_{5,1}$ to the positive terminal of the cell $E_{5,2}$. The cells $E_{5,j}$ are connected via their negative terminal to the terminal N of the battery 4. Advantageously, these negative terminals are connected to the terminal N via connectors of large cross section, since this connection has the function of injecting the parallel currents into the various branches.

A charging/balancing circuit 5 is connected to the terminals of each of the stages. A person skilled in the art will determine a suitable circuit 5 for balancing the voltages of the cells of each stage and of controlling the charging of each of the cells.

The current flowing through a cell $E_{i,j}$ is denoted by $I_{i,j}$. The current flowing through a switch $D_{i,j}$ is denoted by $It_{i,j}$. The voltage at the terminals of a stage i is denoted by $U_i$. The current exchanged via the positive terminals of a stage i with the charging/balancing circuit 5 is denoted by $Ieq_{(i)}$.

A switch is defined as being an electrical protection device having the function of interrupting or very substantially limiting (for example by a factor of 100) the electrical current flowing through it in the event of an overload on an electrical circuit. The design of the switches of the example illustrated will be explained in detail later.

Figure 3:
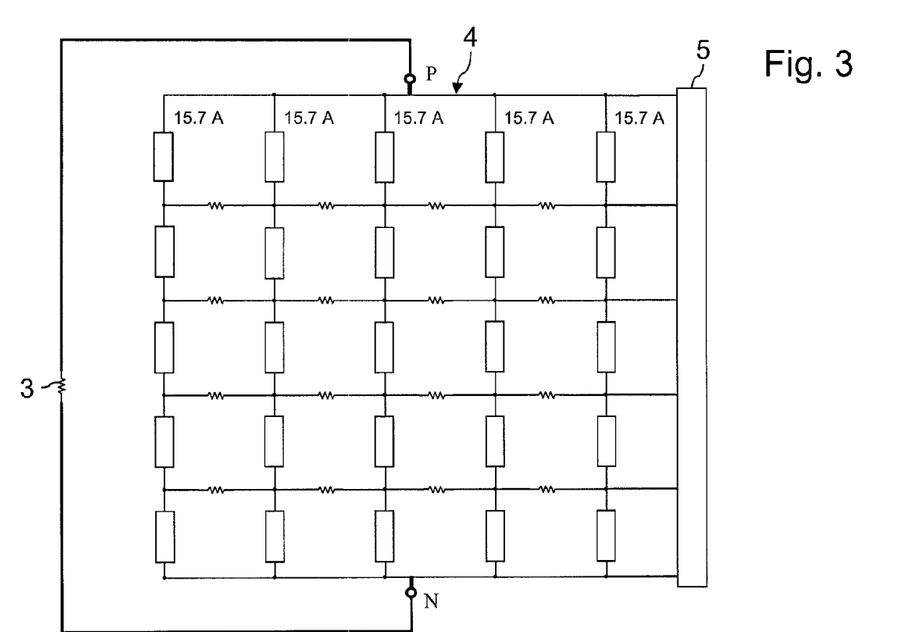
FIG. 3 shows schematically the currents flowing through the cells of the battery in normal operation.

FIG. 3 shows a theoretical example of a battery 4 in normal operation, in the presence of a load 3 connected between the terminals P and N thereof. The load 3 is likened to a 0.2 ohm resistor. Each cell is likened to a 3.3 V voltage source in series with a 0.01 ohm resistor (representative of its internal resistance). The switches are likened to 0.015 ohm resistors, the cutoff threshold of which is 6 A. The connection between the cells in series of a given branch is suitably designed so as to withstand the nominal current of the branch.

In this example, the cells are at their maximum charge and all have the same charge. Thus, no current flows through the switches. In normal operation it may therefore be seen that the switches do not induce Joule losses since the currents flowing through them are zero. The Joule losses inside the battery 4 here are only induced by the internal resistance of the cells. The power efficiency of the battery is thus optimized. A current of 15.7 A flows through each branch, inducing a current of 78.5 A (rounded values) through the load 3.

The switches are placed in parallel connections between the cells. In normal operation, only small currents must flow through these connections while the various cells are being charged or balanced (in particular the end of charging of the battery 4). The currents flowing through the switches in normal operation always remain below the cutoff threshold. Consequently, the switches used may be designed well below that which would be necessary for switches placed in series. It should also be noted that the number of switches used is smaller than that which would be necessary for switches in series. The cost of the battery 4 is thus appreciably reduced.

To provide optimum protection of the cells, the switches have a cutoff threshold below the maximum charging or discharging current tolerated by a cell. In this example, the cutoff threshold is 6 A and substantially below the 15.7 A current flowing through each of the cells of FIG. 3.

Figure 4:
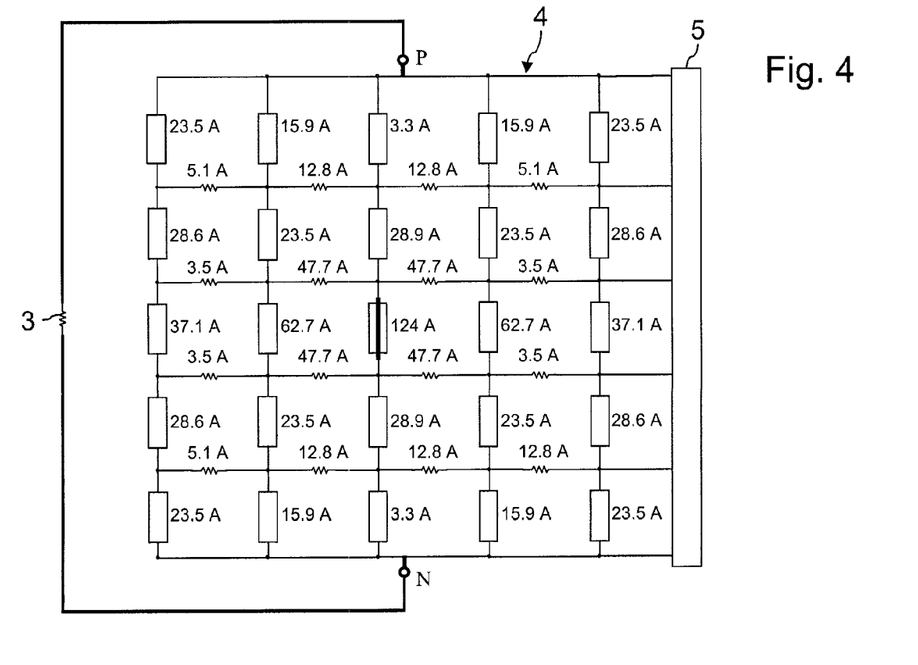
FIG. 4 shows schematically the currents in the battery in the presence of a short circuit when the switches are deactivated.

FIG. 4 illustrates theoretical current values in a situation in which the cell $E_{3,3}$ forms a short circuit and in the absence of cutoff by the switches. Assuming that the maximum charging or discharging current of a cell is 30 A, it may be seen that all the cells of the third stage would be liable to be damaged. It may be seen that relatively large currents flow through the parallel connections between the cells. The currents flowing through the switches $D_{2,2}$, $D_{2,3}$, $D_{3,2}$, $D_{3,3}$, $D_{4,2}$, $D_{4,3}$, $D_{5,2}$ and $D_{5,3}$ would be above their cutoff thresholds.

Figure 5:
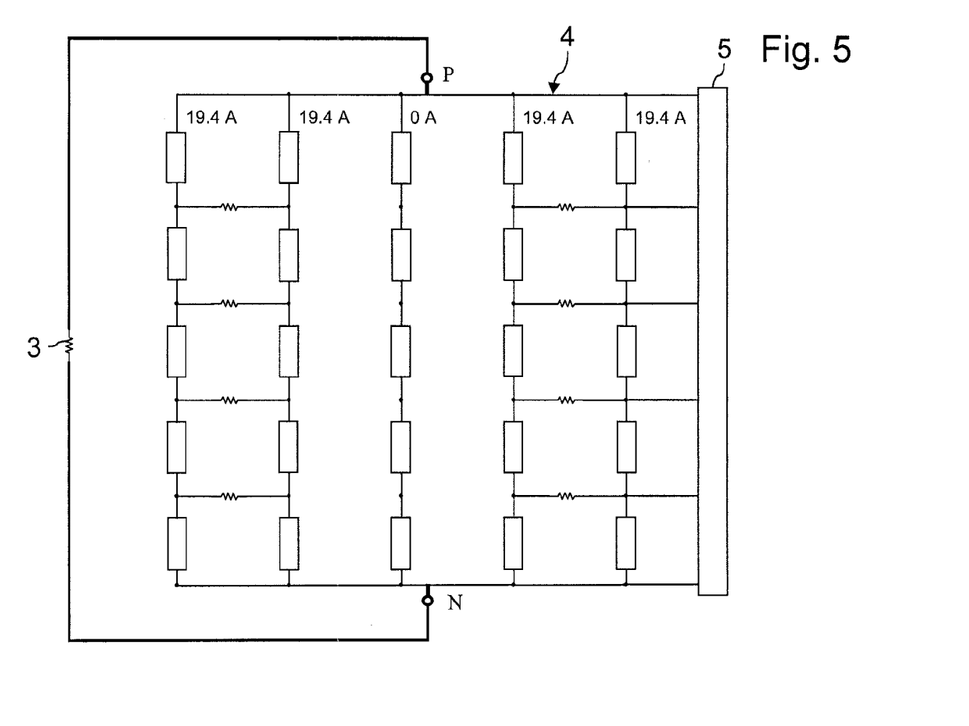
FIG. 5 is a schematic representation of the currents flowing through the cells of the battery after the short circuit.

Thus, as illustrated in FIG. 5, the switches $D_{2,2}$, $D_{2,3}$, $D_{3,2}$, $D_{3,3}$, $D_{4,2}$, $D_{4,3}$, $D_{5,2}$ and $D_{5,3}$ are open because of the overcurrents caused by the cell $E_{3,3}$. The overcurrents are thus limited over time, thereby eliminating any risk of starting a fire through overheating of a cell.

During a transient phase, because of a lower resistance in the branch 3, the latter is recharged by the other branches until the voltage levels of the various branches are balanced. This negative current enables the cells $E_{1,3}$, $E_{2,3}$, $E_{4,3}$ and $E_{5,3}$ to be charged up to a voltage of 3.88 V in order to compensate for the failure of the short-circuited cell $E_{3,3}$. This overvoltage causes no deterioration for cells based on iron phosphate, for which degradation of the electrolyte generally appears above 4.5 V. Other types of cells withstanding a voltage between their terminals above their nominal voltage may also be used. In particular, it is possible to use cells of a type for which the application of a voltage at their terminals 15% above their nominal voltage does not destroy them. The larger the number of stages in the battery, the more limited the overvoltage applied on a cell relative to its nominal voltage upon a short circuit. After the cells of the branch $Br_3$ have been charged by the cells of the other branches, the current flowing through this branch is zero. At this instant, a current of 19.4 A, below the nominal 30 A current of the cells, flows through the branches $Br_1$, $Br_2$, $Br_3$ and $Br_4$. The cells of the various branches are therefore well protected from overcurrents caused by a short circuit in one of the cells. The transverse currents $It_{i,j}$ are zero. The current flowing through the load 3 is 77.6 A, i.e. a value close to the current during normal operation of the battery 4. Once the cells of the branch $Br_3$ have been recharged, this branch may also deliver a current of lower amplitude in order to supply the load 3.

Figure 6:
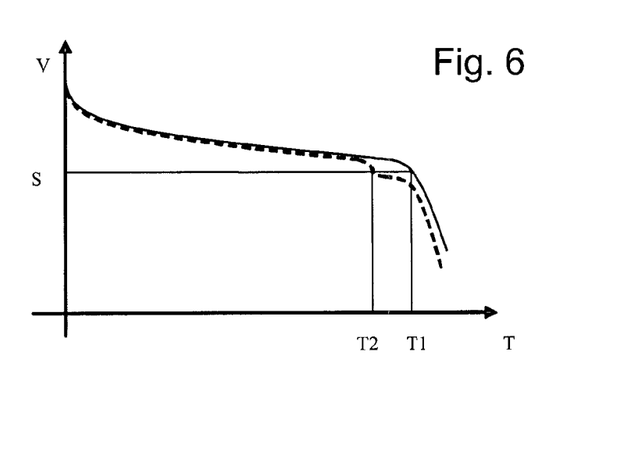
FIG. 6 is a graph showing the discharging profiles of the battery.

FIG. 6 shows the discharge profiles for discharging the battery 4 in normal operation (bold curve) and in the presence of a short-circuited cell (broken curve) respectively. It may be seen that the voltage between the terminals N and P of the battery 4 when fully charged is maintained at the same level. In the case of one cell failing, the discharge limit threshold S of the battery 4 is reached earlier, at a time T2. In normal operation, this discharge threshold is reached only at a time T1. The performance of the battery 4 is thus reduced when a failure is present. The circuit 3 can detect the failure of a cell by noting a drop in the discharge time below a predefined threshold. This failure may be signaled to the person using the battery in order to inform him of the need to repair the battery. However, the battery 4 still remains functional over several charge/discharge cycles before having to be repaired. Since the switches have prevented a deterioration of the other cells, the repair may consist in merely changing the defective cell.

Figure 7:
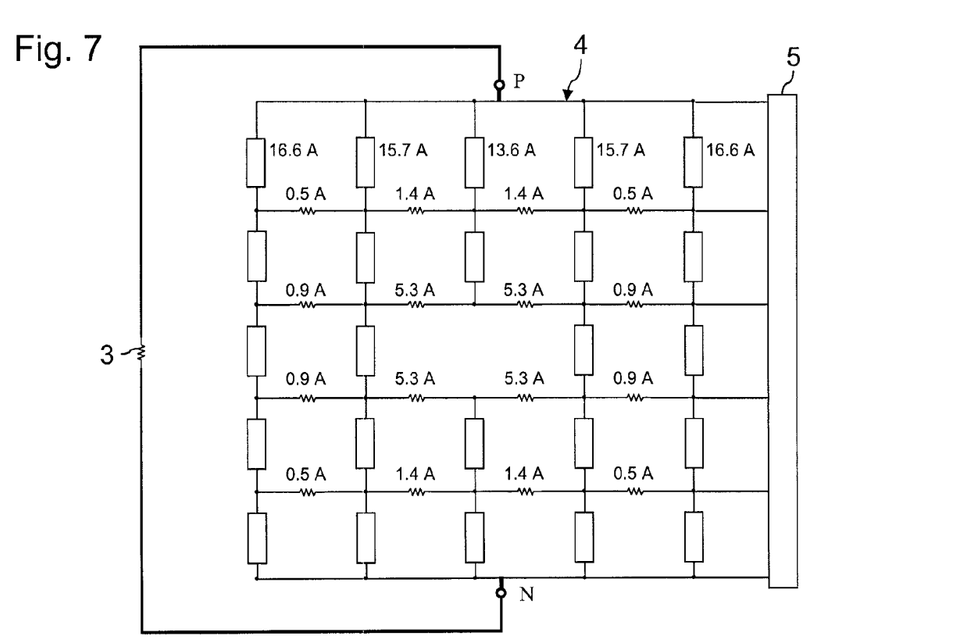
FIG. 7 is a schematic representation of the currents when a cell is in open circuit.

FIG. 7 illustrates the battery 4 upon failure of a cell forming either an open circuit or a short circuit, in this case the cell $E_{3,3}$. The switches forming parallel connections enable the other cells to compensate for the failure of the cell $E_{3,3}$. A current of 0.5 A flows through the switches $D_{2,1}$, $D_{2,4}$, $D_{5,1}$ and $D_{5,4}$. A current of 0.9 A flows through the switches $D_{3,1}$, $D_{3,4}$, $D_{4,1}$ and $D_{4,4}$. A current of 1.4 A flows through the switches $D_{2,2}$, $D_{2,3}$, $D_{5,2}$ and $D_{5,3}$. A current of 5.3 A flows through the switches $D_{3,2}$, $D_{3,3}$, $D_{4,2}$ and $D_{4,3}$. Thus, each of the currents flowing through the switches does not exceed the cutoff threshold of these switches. Thus, all the functional cells discharge, the capacity of the battery 4 therefore slightly being reduced. Battery 4 therefore remains functional for a certain number of charge/discharge cycles. Currents of 16.6 A, 15.7 A, 13.6 A, 15.7 A and 16.6 A flow through the respective cells $E_{1,j}$ of the first stage $Et_1$, these currents being below the nominal limit of each of these cells.

The circuit 5 can identify the failure of the cell $E_{3,3}$, especially because of the more rapid discharging of the stage $Et_3$. This failure may be signaled to the person using the battery 4 in order to inform him of the need for repair.

Advantageously, the switches are designed in such a way that a short-circuited cell causes a cutoff by at least one switch and in such a way that an open-circuited cell conducts currents in the various switches causing no cutoff.

In the example illustrated in FIGS. 3 to 7, the circuit 5 is connected to the branches $Br_1$ to $Br_4$ via the nodes of the branch $Br_5$. After cutting off the switches to isolate a branch including a defective cell, the branches lying beyond are no longer connected to the circuit 5 and can no longer be balanced. In the failure examples illustrated in FIGS. 4 to 7, the branches $Br_1$ and $Br_2$ are no longer balanced by the circuit 5.

Figure 8:
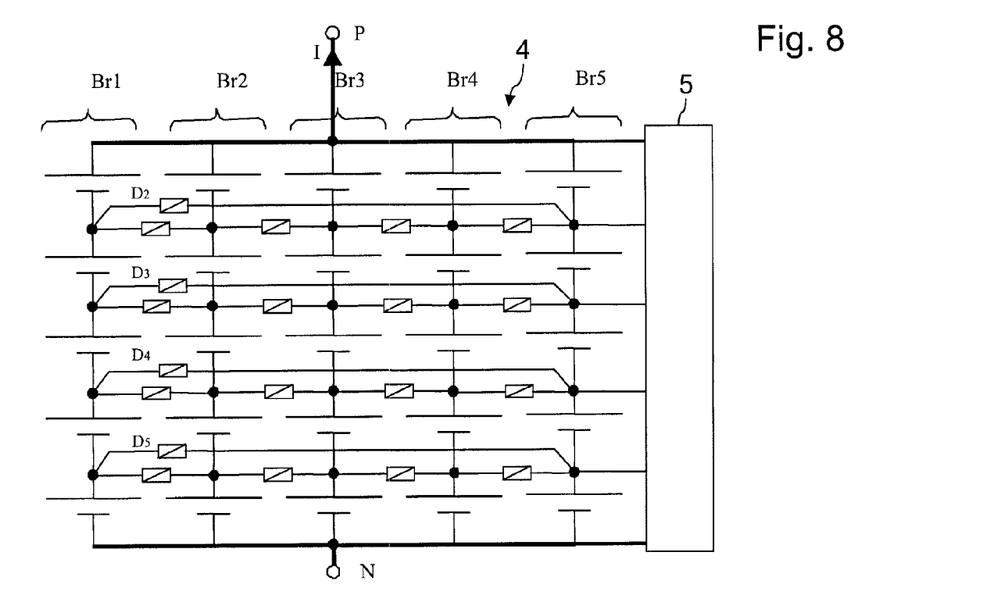
FIGS. 8 and 9 are schematic representations of other embodiments of a battery according to the invention.

FIG. 8 illustrates one embodiment of a battery 4 overcoming this drawback. The principle of this embodiment is to connect together the nodes of one and the same stage of opposed branches. Thus, the nodes of the branches $Br_1$ and $Br_5$ are connected together via the switches $D_2$ to $D_5$ respectively. The circuit 5 may thus proceed to charging and balancing of all the nondefective branches even in the presence of a defective branch. It is also conceivable to connect two nonadjacent cells of a given stage to the balancing circuit 5.

Figure 9:
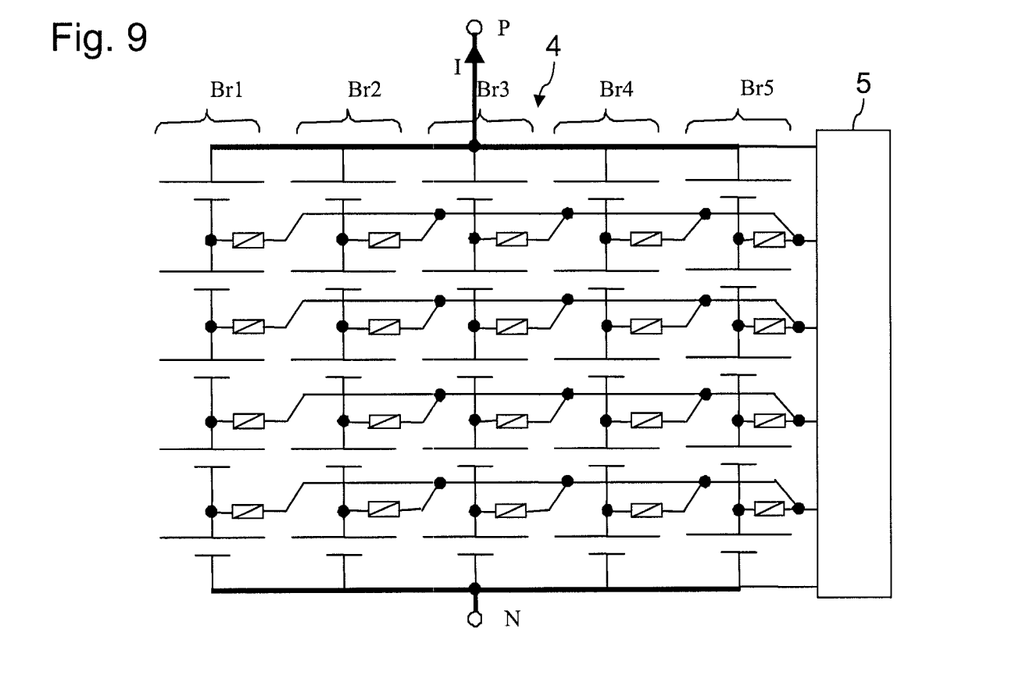
Figure 10:
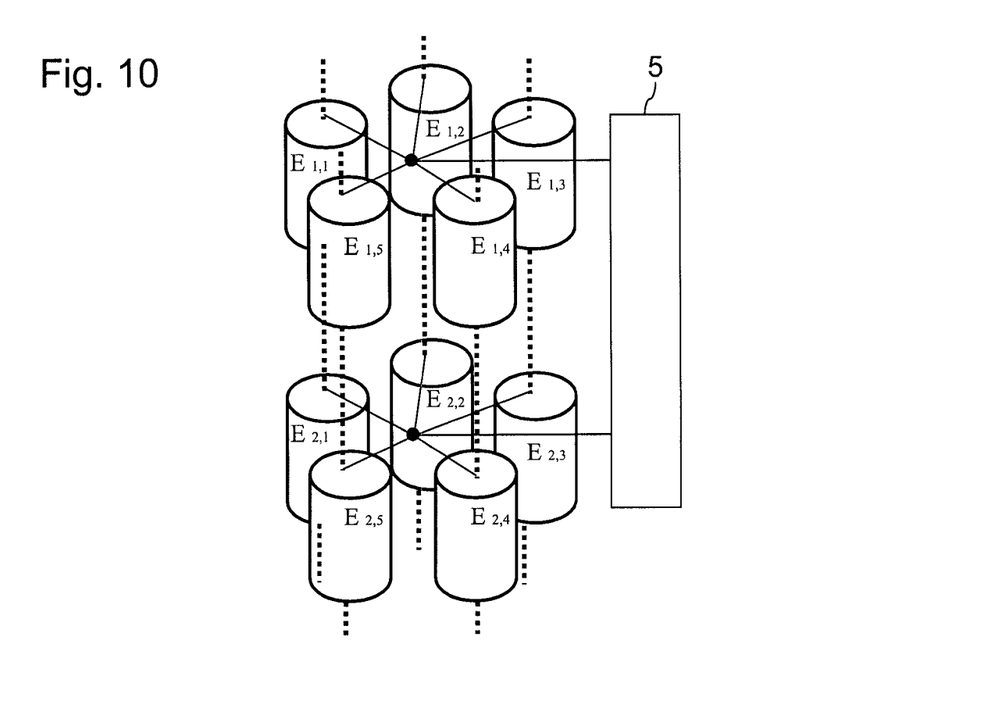
FIG. 10 is an exploded perspective view of an example of an arrangement of cells in another embodiment of a battery according to the invention.

FIG. 9 shows another embodiment in which the terminals of the cells of a given stage are all connected to one and the same terminal of the circuit 5. Such a connection makes it possible to facilitate the charge balancing carried out by the circuit 5. In addition, such a connection is particularly advantageous when each stage is formed from several cells distributed radially in order to form a substantially cylindrical battery, as illustrated in FIG. 10. The dotted lines correspond to the electrical connections in series between the various stages of the battery 4.

Figure 11:
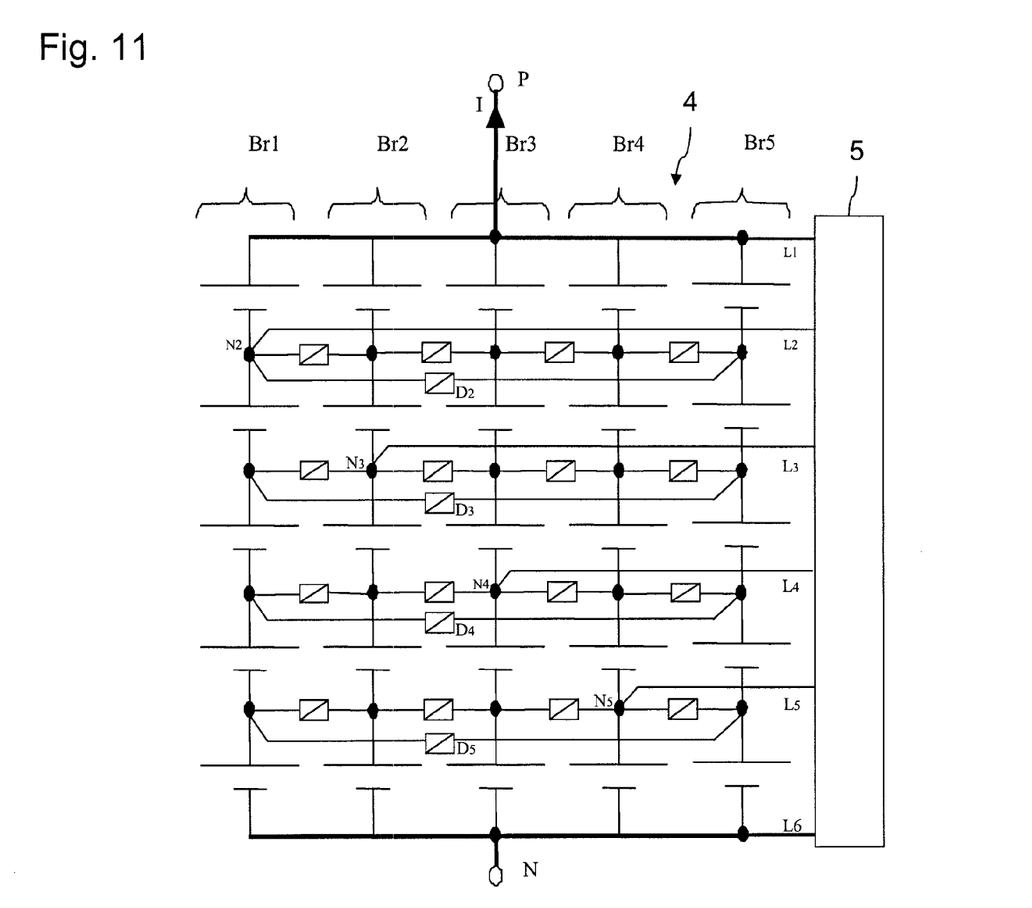
FIG. 11 is a schematic representation of another embodiment of a battery according to the invention.

FIG. 11 is a schematic representation of another embodiment of a storage battery 4 according to the invention. As in the example shown in FIG. 8, the nodes of the branches $Br_1$ and $Br_5$ are connected together via the switches $D_2$ to $D_5$ respectively, so as to charge and balance all the nondefective branches, even in the presence of a defective branch. The circuit 5 is connected to the terminals of each stage of cells via the connections L1 to L6. Moreover, the circuit 5 has a direct connection (a connection not passing through a connection node between two cells) with each of the branches $Br_1$ to $Br_5$, in this case at the nodes N2 to N5. The nodes N2 to N5, connected directly to the circuit 5, connect two cells of a given branch in series. Thus, for any branch, it is possible to determine the voltage between such a node and the terminal P, and also the voltage between such a node and the terminal N. In this way it is possible to identify in which branch a cell is short-circuited or open-circuited. A short-circuited cell will in particular modify the voltage between the node and the terminal N, as well as modify the voltage between the node and the terminal P. In the example illustrated, each connection of the circuit 5 to a node N2 to N5 thus makes it possible to determine both the defective branch and to proceed to charging a stage of the battery 4.

The resistance of the parallel connections of these cells (for example the internal resistance of the switches) is advantageously higher than the internal resistance of the cells. Thus, the amplitude of the currents in the cells is limited before the switches cause a cutoff. The effect of the failure of a cell on distant branches is also limited. When the cell 5 is connected through the nodes of a single branch, the resistance of the switches is limited so as to prevent the time for charging the branches away from the circuit 5 from increasing excessively.

The switches illustrated are in this case fuses. The conducting section of a fuse melts when a current above its nominal threshold flows through it. Other types of switches may of course be used. In particular, it is possible to use resettable switches. Switches of the PTC (positive temperature coefficient) type, in which the resistance suddenly increases greatly with temperature, may also be used. The increase in the resistance of such a switch makes it possible to limit to very low values the current flowing through it, resulting in dissipation, without any melting, of the energy produced by the Joule effect. If the fault causing the current in the switch disappears, the switch progressively returns to its initial conduction level. In particular, PTC-type switches are commercially available.

The invention claimed is:

1. A storage battery comprising a plurality of cells arranged in at least three branches, each branch having at least n cells connected in series, wherein n≥2 and wherein the cells with index i of each branch being connected in parallel and forming a stage of index i, with i being between 1 and n; the battery further comprising fusible electrical connections, each fusible electrical connection connecting two cells of a given stage in parallel and two cells of an adjacent stage in parallel, wherein the cutoff threshold of the fusible electrical connections are designed to conduct current when one of said cells it connects forms an open circuit; the battery further comprising a balancing circuit, for balancing the charge of the cells, said balancing circuit being connected to a terminal of each stage by way of at least two different nodes within each stage; wherein the number of cells, n, in each branch is high enough so that an overvoltage caused by a short circuit in a cell does not destroy the other cells in the respective branch.

2. The battery of claim 1, in which each electrical connection between the cells connected in parallel is linked to the balancing circuit through a respective fusible electrical connection.

3. The battery of claim 1, wherein the cells of the first and third branches are nonadjacent, and wherein the balancing circuit is connected to the terminals of the cells of the nonadjacent branches.

4. The battery of claim 1, wherein the balancing circuit is connected to each of the branches via a node of each branch connecting two cells of the branch in series.

5. The battery of claim 1, wherein a cross section of each parallel electrical connection between the cells is smaller than the cross section of each of the series electrical connection between cells.

6. The battery of claim 1, wherein the cutoff threshold of at least one fusible electrical connection is designed to open when one of the cells is short-circuited.

7. The battery of claim 1, wherein the cells are selected to tolerate application of a voltage at their terminals of 15% above a nominal voltage thereof.

8. The battery of claim 1, wherein the cells are lithium ion cells.

9. The battery of claim 1, wherein the branches comprise cells that are directly connected to each other in series.

10. The battery of claim 1, wherein the internal resistance of said cells is less than the internal resistance of said fusible electrical connection.

* * * * *